United States Patent [19]

Smith et al.

[11] Patent Number: 5,432,780
[45] Date of Patent: Jul. 11, 1995

[54] HIGH CAPACITY SECTORIZED CELLULAR COMMUNICATION SYSTEM

[75] Inventors: John M. Smith, Elgin; James F. Long, Glen Ellyn; Ronald J. Wanat, Elgin; Anthony Kobrinetz, Hoffman Estates, all of Ill.

[73] Assignee: Motorola, Inc., Schaumburg, Ill.

[21] Appl. No.: 48,916

[22] Filed: Apr. 19, 1993

Related U.S. Application Data

[63] Continuation of Ser. No. 640,588, Jan. 16, 1991, abandoned, which is a continuation-in-part of Ser. No. 243,542, Sep. 12, 1988, abandoned.

[51] Int. Cl.⁶ .......................... H04B 7/26; H04B 7/02
[52] U.S. Cl. ..................................... 370/37; 370/69.1; 370/95.1; 370/38; 379/59; 455/33.1; 455/53.1
[58] Field of Search ............. 370/69.1, 38, 40, 37, 370/95.1, 95.3; 455/33.1, 33.3, 33.4, 53.1, 54.1, 55.1, 56.1; 379/59, 60, 63, 56

[56] References Cited

U.S. PATENT DOCUMENTS

| | | | |
|---|---|---|---|
| 3,663,762 | 5/1972 | Joel, Jr. | 379/60 |
| 3,764,915 | 10/1973 | Cox et al. | 455/33.1 |
| 3,819,872 | 6/1974 | Hamrick | 379/60 |
| 3,906,166 | 9/1975 | Cooper et al. | 379/60 |
| 3,962,553 | 6/1976 | Linder et al. | 379/61 |
| 4,128,740 | 12/1978 | Graziano | 455/33.1 |
| 4,144,411 | 3/1979 | Frenkiel | 379/60 |
| 4,144,496 | 3/1979 | Cunningham et al. | 455/33.3 |
| 4,268,722 | 5/1981 | Little et al. | 370/18 |
| 4,475,010 | 10/1984 | Huensch et al. | 370/94.1 |
| 4,726,050 | 2/1988 | Menich et al. | 455/33.3 |
| 5,021,801 | 6/1991 | Smith et al. | 455/56.1 |
| 5,048,116 | 9/1994 | Schaeffer | 455/33.3 |

FOREIGN PATENT DOCUMENTS

| | | |
|---|---|---|
| 2220117 | 12/1989 | United Kingdom . |
| WO852745 | 6/1985 | WIPO . |
| WO870518 | 8/1987 | WIPO . |

*Primary Examiner*—Wellington Chin
*Attorney, Agent, or Firm*—F. John Motsinger; Kevin A. Buford; Shawn B. Dempster

[57] ABSTRACT

A cellular radiotelephone communication system cell site equipment is provided. The cell site equipment includes a radio frequency transmitter operating as one signal frequency source. In addition, the cell site equipment includes a first and a second signal combiner device tuned to a first and a second signal frequency, respectively. Further, the cell site equipment includes a radio frequency switching mechanism, operatively coupled to the radio frequency transmitter, the first signal combiner device, and the second signal combiner device, for coupling the radio frequency transmitter to either of the first and the second signal combiner devices. In one embodiment, each signal combiner device includes a resonant cavity for isolating a signal frequency source from other signal frequency sources and a coupling for coupling the isolated signal frequency source to a common transmitter output. In an alternative embodiment, each signal combiner device includes a resonant cavity for isolating a signal frequency source from other signal frequency sources and a coupling for coupling the isolated signal frequency source of the first and the second signal combiner device to a first and a second common transmitter output, respectively.

11 Claims, 6 Drawing Sheets

— PRIOR ART —

HIGH CAPACITY SECTORIZED CELLULAR COMMUNICATION SYSTEM

CONTINUATION-IN-PART

This patent application is a continuation of U.S. application Ser. No. 640,588, filed Jan. 16, 1991, now abandoned which is a continuation in part of copending U.S. application Ser. No. 243,542 filed Sep. 12, 1988, abandoned, the priority for the common subject matter of which is hereby claimed.

FIELD OF THE INVENTION

The present invention relates generally to radio frequency (RF) communication systems, and, more particularly, to sector-transmit and sector-receive cellular communication systems.

DESCRIPTION OF THE PRIOR ART

Mobile radiotelephone service has been in use for some time and traditionally has been characterized by a central site transmitting with high power to a limited number of mobile or portable units in a large geographic area. Mobile or portable transmissions, due to their lower transmission power, were generally received in previous systems by a network of receivers remotely located from the central site and received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of available radio channels which can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166, 4,485,486, and 4,549,311, each assigned to the assignee of the present invention.

Some of the more spectrally efficient cellular radiotelephone systems employ center illumination in which each cell is subdivided into sectors. The sectors are illuminated by directional antennas. Each sector is provided with a number of dedicated voice channels. Such a system is described in U.S. Pat. Nos. 4,128,740 and 4,696,027, each assigned to the assignee of the present invention. The sectors are used to substantially eliminate interference from adjacent co-channels.

Unfortunately, the known spectrally efficient cellular radiotelephone systems cannot provide sufficient channel capacity to accommodate the ever-increasing demands of a cellular operation. Consider a relatively large cell wherein each sector covers a large geographic area. An aggregation of subscribers in a given sector can readily occupy every available voice channel available in that sector.

There has, however, been system development to overcome this problem. One particular system, as is described in U.S. Pat. No. 4,144,411, subdivided each cell into subcells which operate simultaneously on independent and noninterferring voice channels. Although this implementation has proven quite useful for increasing channel capacity in each cell, it is rather expensive to implement due to the duplicity of base site equipment that is required.

Further, none of the above discussed techniques accommodate narrow and long communication paths in which cellular communication is required at low cost and over long and narrow geographic zones, for example, along highways or train tracks.

There is therefore a need for a cellular radiotelephone system which overcomes these deficiencies.

SUMMARY OF THE INVENTION

A cellular radiotelephone communication system cell site equipment is provided. The cell site equipment includes a radio frequency transmitter operating as one signal frequency source. In addition, the cell site equipment includes a first and a second signal combiner device tuned to a first and a second signal frequency, respectively. Further, the cell site equipment includes a radio frequency switching mechanism, operatively coupled to the radio frequency transmitter, the first signal combiner device, and the second signal combiner device, for coupling the radio frequency transmitter to either of the first and the second signal combiner devices. In one embodiment, each signal combiner device includes a resonant cavity for isolating a signal frequency source from other signal frequency sources and a coupling for coupling the isolated signal frequency source to a common transmitter output. In an alternative embodiment, each signal combiner device includes a resonant cavity for isolating a signal frequency source from other signal frequency sources and a coupling for coupling the isolated signal frequency source of the first and the second signal combiner device to a first and a second common transmitter output, respectively.

DETAILED DESCRIPTION OF THE PREFERRED EMBODIMENT

Figure 1:
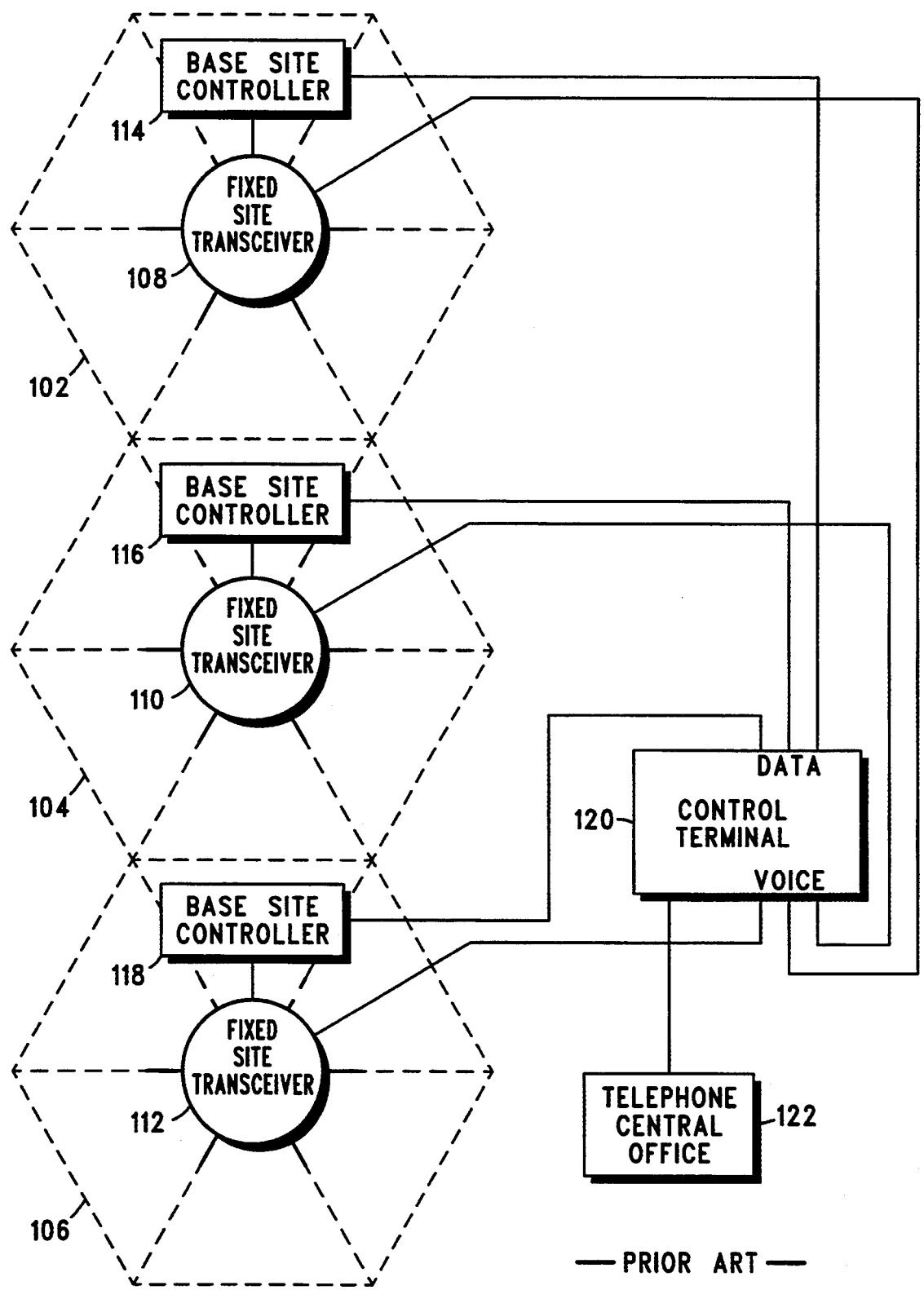
FIG. 1 is a block diagram of a conventional center illuminated sector radiotelephone communication system.

Referring now to FIG. 1, there is illustrated a cellular radiotelephone communications system of the type which may particularly benefit from the invention herein described. Such a cellular communications system is further described in U.S. Pat. No. 3,663,762, 3,906,166; in an experimental cellular radiotelephone system application with the Federal Communications Commission by Motorola and American Radio-Telephone Service, Inc., in February 1977; and more recently in a system described entitled "Motorola DYNATAC Cellular Radiotelephone System", published by Motorola, Inc., Schaumburg, Illinois in 1982. Such cellular systems provide telephone coverage to both mobile and portable radiotelephones located throughout a large geographical area. Portable radiotelephones may be of the type described in U.S. Pat. Nos. 4,486,624; 3,962,553; and 3,906,166 and each assigned to the assignee of the present invention; and mobile radiotelephones may be of the type described in Motorola instruction manual number 68P81039E25, published by Motorola Service Publications, Schaumburg, Illinois in 1979. Although the present invention will be described with particularity for the center illuminated sector cell system, it is obvious that a person skilled in the art may be able to apply the essence of the present invention to other types of sectorized cellular configurations.

As illustrated in FIG. 1, the geographical area is subdivided into cells 102, 104 and 106 which are illuminated with radio frequency energy from fixed site transceivers 108, 110, and 112, respectively. The fixed site transceivers may be controlled by base site controllers 114, 116 and 118 as illustrated. These base site controllers are each coupled by data and voice links to a radiotelephone control terminal 120 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 120 is, in turn, coupled to the switched telephone network via a conventional telephone central office 122 for completing calls between mobile and portable radiotelephones and landline telephones.

For a more detailed discussion of the system illustrated in FIG. 1, reference may be made to U.S. Pat. No. 4,699,027, supra.

Figure 2:
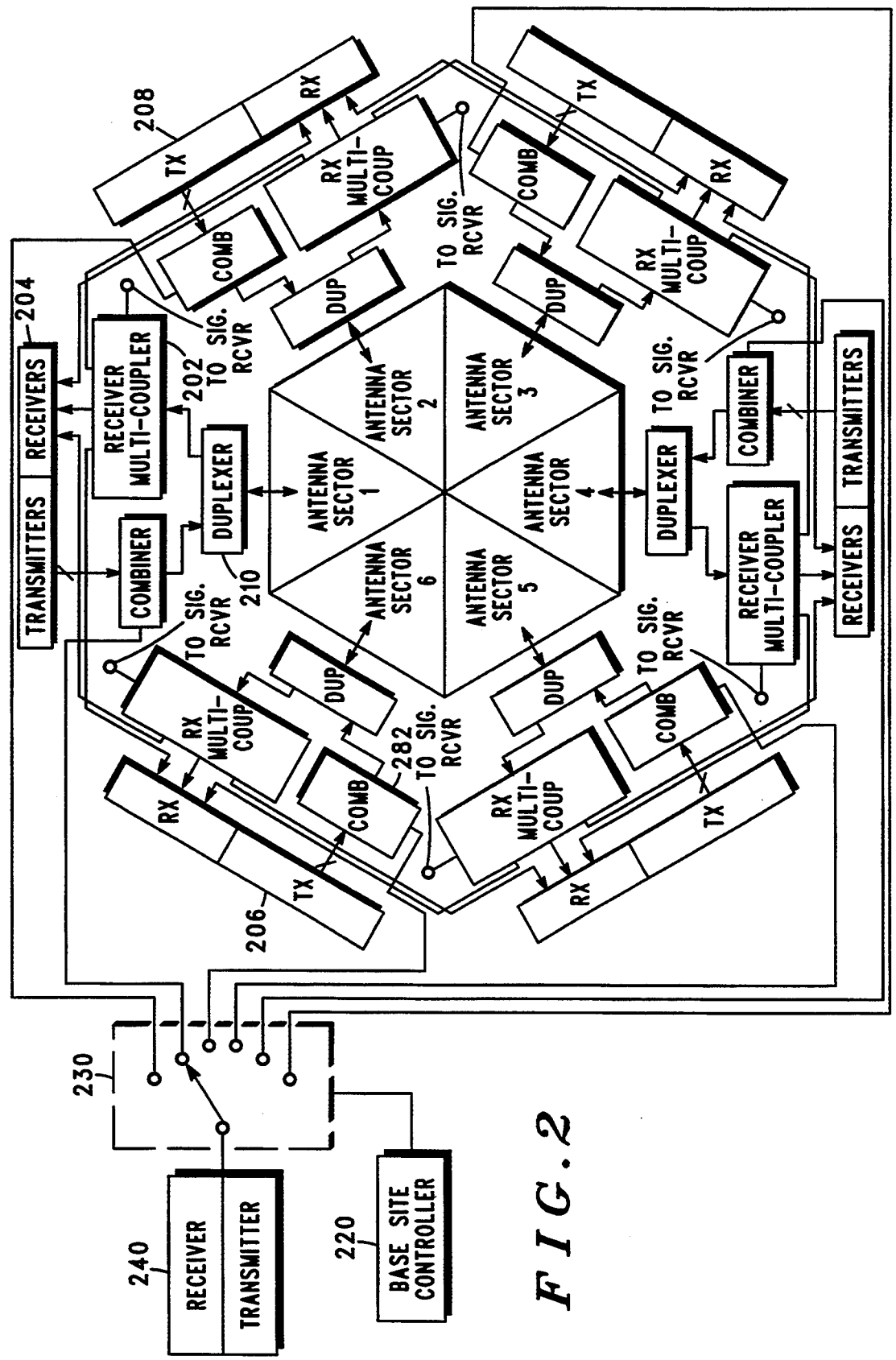
FIG. 2 is a more detailed block diagram of cell site equipment which may be used by the system illustrated in FIG. 1, according to the present invention.

In one implementation of the present invention realizing sectorized cells, the radio transceivers are connected to the sector antennas as shown in FIG. 2. Each sector antenna is fed by a multicoupler (for example, RX multicoupler 202) to the primary transceiver equipment dedicated to the particular sector (for example, transceivers 204) and to both the adjacent sector transceiver equipment (for example, transceivers 206 for sector 6 and transceivers 208 for sector 2). The transceivers 204, or 208 provide communication for voice channels which are dedicated for use at the associated sector. In addition, each sector antenna is coupled to a signalling receiver allowing the signalling receiver to have access to all six sector antennas. The transmitters of the primary transceiver equipment are coupled to the sector antennas, via respective combiners (Eg. combiner 282), and duplexers (such as duplexer 210). The duplexers may be similar to model ACD-2802-AMMO manufactured by Antenna Specialists Co., Cleveland, Ohio. The combiners 282 may be implemented using SRF4006B, available from Motorola, Inc., 1501 W. Shure Drive, Arlington Heights, Illinois.

A base site controller 220 is used to control a 6-way switch 230 which couples a floating voice channel transceiver 240 to each duplexer 210, via a combiner 282. The transceiver 240 is referred to as a floating voice channel transceiver because it provides, in accordance with the present invention, a voice channel which can float between sectors as channel requests are made in each sector. The receiver portion of the transceiver 240 is interconnected (interconnection not shown) with the receiver multicouplers 202 in the same manner as is illustrated for the transceivers 204, 206 and 208.

This floating implementation is particularly advantageous for rural cellular radiotelephone applications wherein each geographical region covered by an individual sector can be extended beyond typical coverage areas. Consider, for example, a cellular system, according to the present invention, that is designed to cover a large rural geographical area. Each sectorized cell would include a plurality of high gain sectorized antennas, each capable of transmitting at significantly greater radiated power levels than present implementations, e.g., at 500 Watts rather than at current levels approximating 100 Watts. Such increases in transmit power can cost effectively be accomplished by employing conventional high gain sectorized antennas. The signalling channel in the inventive system, as well as in a conventional sectorized cell system, employs an omni-directional antenna. Since the gain of the omni-directional antenna is lower than the gain of a sector antenna, a higher power amplifier is required for the signalling channel in order to match the effective radiated power levels for each type of channel.

Figure 3:
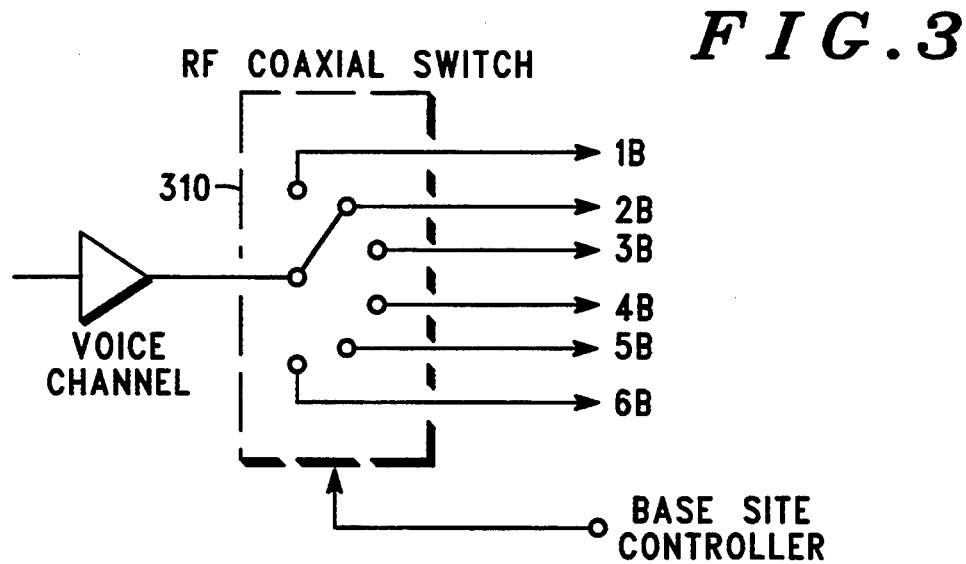
FIG. 3 is diagram of an RF switch employable by the the system illustrated in FIG. 2, according to the present invention.

A preferred implementation of a floating voice channel system is described with reference to FIGS. 3, 4A, 4B and 4C. FIG. 3 illustrates a floating voice channel targeted for one of six sectors of a cell. FIG. 3 also includes a conventional internally terminated RF coaxial switch 310, such as the 6-IT-2L31 available from DB products, Pasadena, Calif, which switch is used in a manner similar to the switch 230 of FIG. 2. This preferred implementation differs from the implementation of FIG. 2 in that the system employs a plurality of floating voice channels rather than only one floating voice channel. The switch 310 of FIG. 3 is a representative switch for one voice channel (one such switch is utilized for each floating voice channel) that allows the base site controller to dynamically switch the one associated voice channel to any particular sector.

Such dynamic switching is useful, for example, when a subscriber transits from one sector to another. In this instance, the base site controller needs only to switch a floating voice channel assigned to the subscriber to the next sector. More importantly, as previously discussed, this dynamic switching provides significant improvement to the system in that each available floating voice channel can be switched to any sector to service an influx of subscribers demanding service thereat. The availability of a single floating channel provides a channel capacity increase for every sector in a cell. At least in part, because radiotelephone calls are relatively brief and because communication systems can be designed such that a request for an additional communication channel in a particular geographic region is unlikely, the effective channel capacity improvement is significantly greater than what would otherwise be achieved by adding additional fixed channels in each sector. For example, the effective channel capacity improvement is illustrated by comparing two cells providing substantially identical traffic density characteristics (e.g., using conventional Erlang unit measurements). The first cell is a conventional cell having 6 sectors with 3 dedicated channels per sector and having no floating channels, and the second cell is a cell, designed in accordance with the present invention, having 6 sectors with 1 dedicated channel per sector and having 5 floating channels employable within the cell. It is readily apparent that 18 channels are required for the conventional implementation, while only 11 channels are required for the inventive implementation.

For a statistical analysis on the practicability of "overflow" channels in a general communication system, reference may be made to "Practical Traffic Engineering of Least Cost Routing Systems—Part 5, 'Peaked' Traffic: What It Is and When You Should Worry About It", Michael T. Hills, Business Communications Review, July–August, 1983.

One skilled in the art will recognize the need to avoid co-channel interference between sectorized regions. For example, it is useful to avoid such interference by employing floating channels that have ample reuse distance. The orientation of the dedicated channels is preferably designed as is illustrated and described in U.S. Pat. No. 4,128,740, assigned to the assignee of the present invention.

One skilled in the art will further recognize that any number of dedicated channels per sector may be employed and that any number of floating channels per cell may be employed without departing from the scope of the present invention. For example, it may desirable to employ zero dedicated channels per sector and a plurality of floating channels per cell.

Figure 4A:
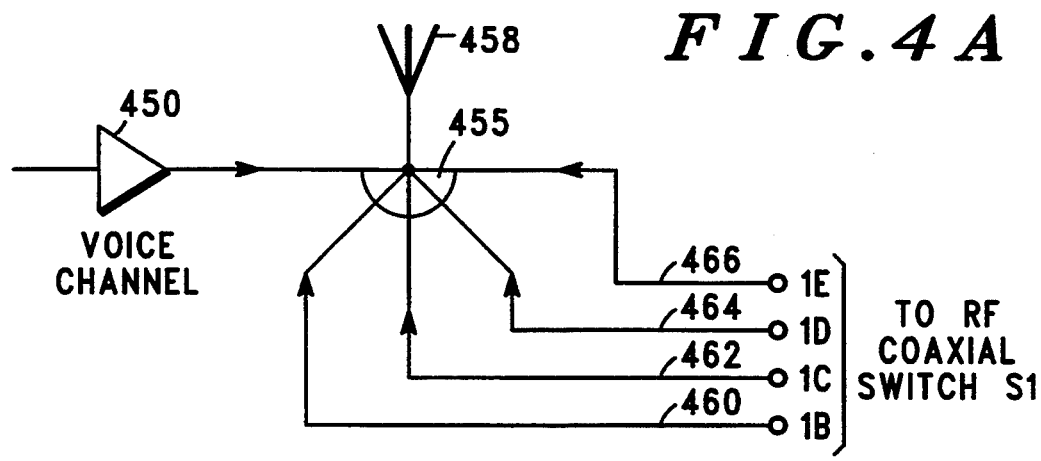
FIGS. 4a, 4b, and 4c comprise diagrams of equipment employed at the sectors in the system illustrated in FIG. 2, according to the present invention.

In FIG. 4a, a general block diagram of the floating voice channel interconnection is illustrated for sector 1 of a representative cell. A voice channel transmitter 450 is shown coupling a sector dedicated (or fixed) voice channel, i.e., a voice channel which does not float, to a conventional channel combiner 455. Also intercoupled to the combiner 455 are signal paths 460, 462, 464 and 466 for respectively carrying four floating voice channels from an RF coaxial switch 310. The combiner 455 operates conventionally to intercouple the voice channels (paths) to the sector's antenna 458.

Figure 4B:
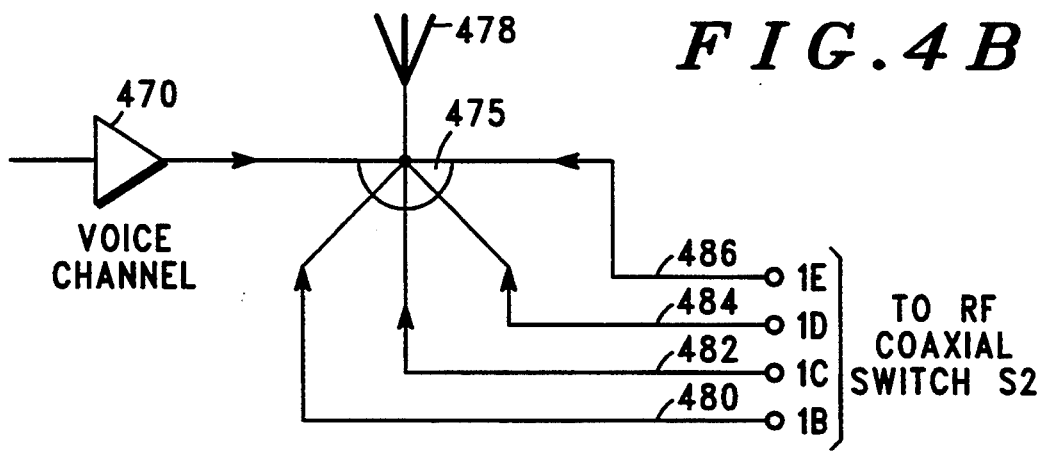

FIG. 4B illustrates a general block diagram of the equipment for sector 2 of the representative cell, which equipment is essentially identical to the equipment illustrated in FIG. 4A. In FIG. 4B, a voice channel transmitter 470 is shown coupling another sector dedicated voice channel to a similar channel combiner 475. Coupled to an antenna 478, via the combiner 475, are signal paths 480, 482, 484 and 486 for respectively carrying the same four floating voice channels from another RF coaxial switch 310 dedicated for use at sector 2 of the representative cell.

Figure 4C:
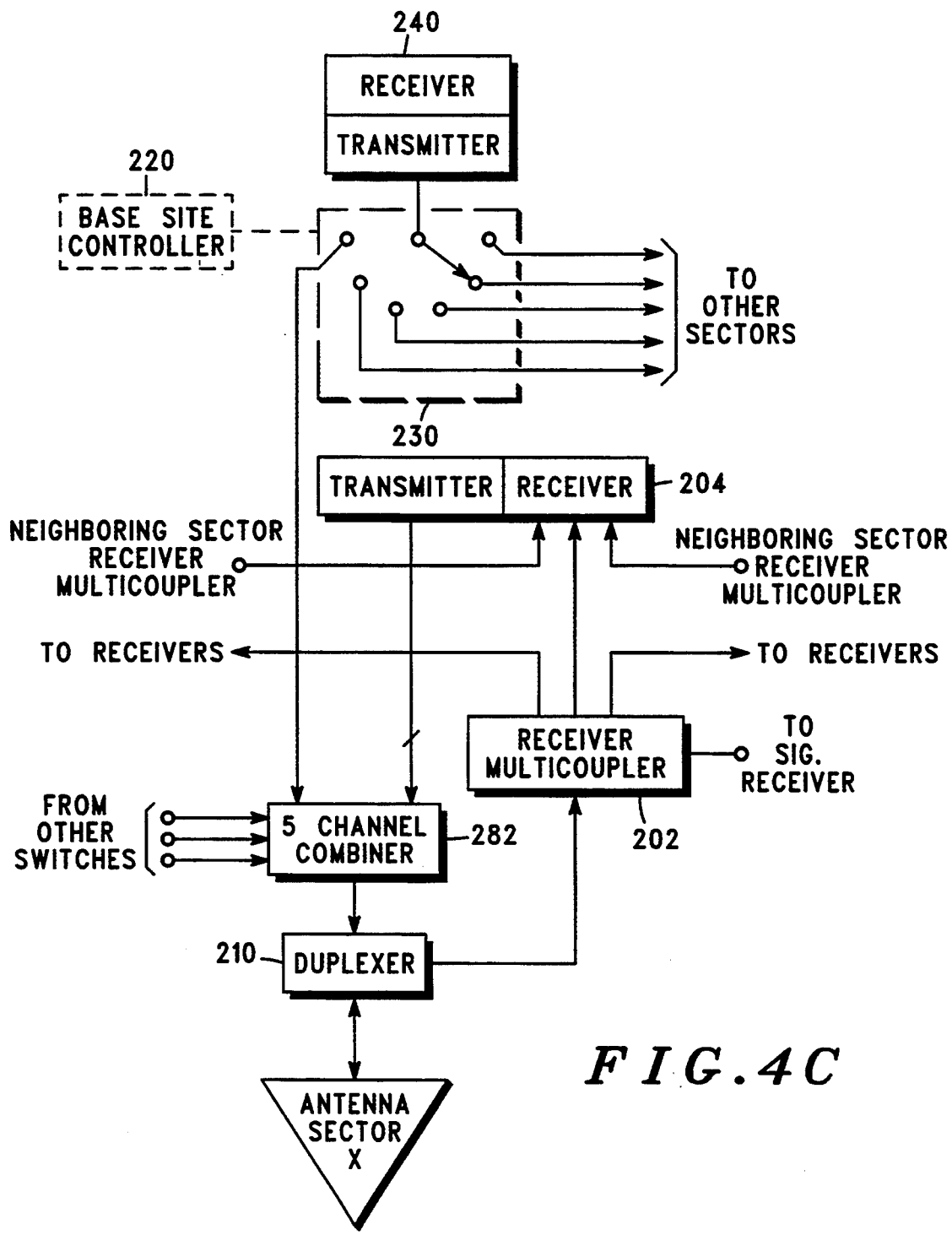

In more detail than the block diagram of FIGS. 4A and 4B and consistent with the equipment of FIG. 2, FIG. 4C illustrates a block diagram of equipment for a representative sector for such an inventive system. Included therein are blocks representative of those illustrated in FIG. 2: base site controller 220, (voice channel) transceiver 240, switch 230, transceivers 204, duplexer 210, receiver multicoupler 202, and 5 channel combiner 282, representative of the combiner 455 or 475 of FIGS. 4A and 4B. The combiner 282 is illustrated combining the outputs of the switch 230, the other switches (not shown) and the outputs of transceivers (transmitters) 204 to the duplexer 210. Other interconnections are consistent with the illustration of FIG. 2.

Figure 6:
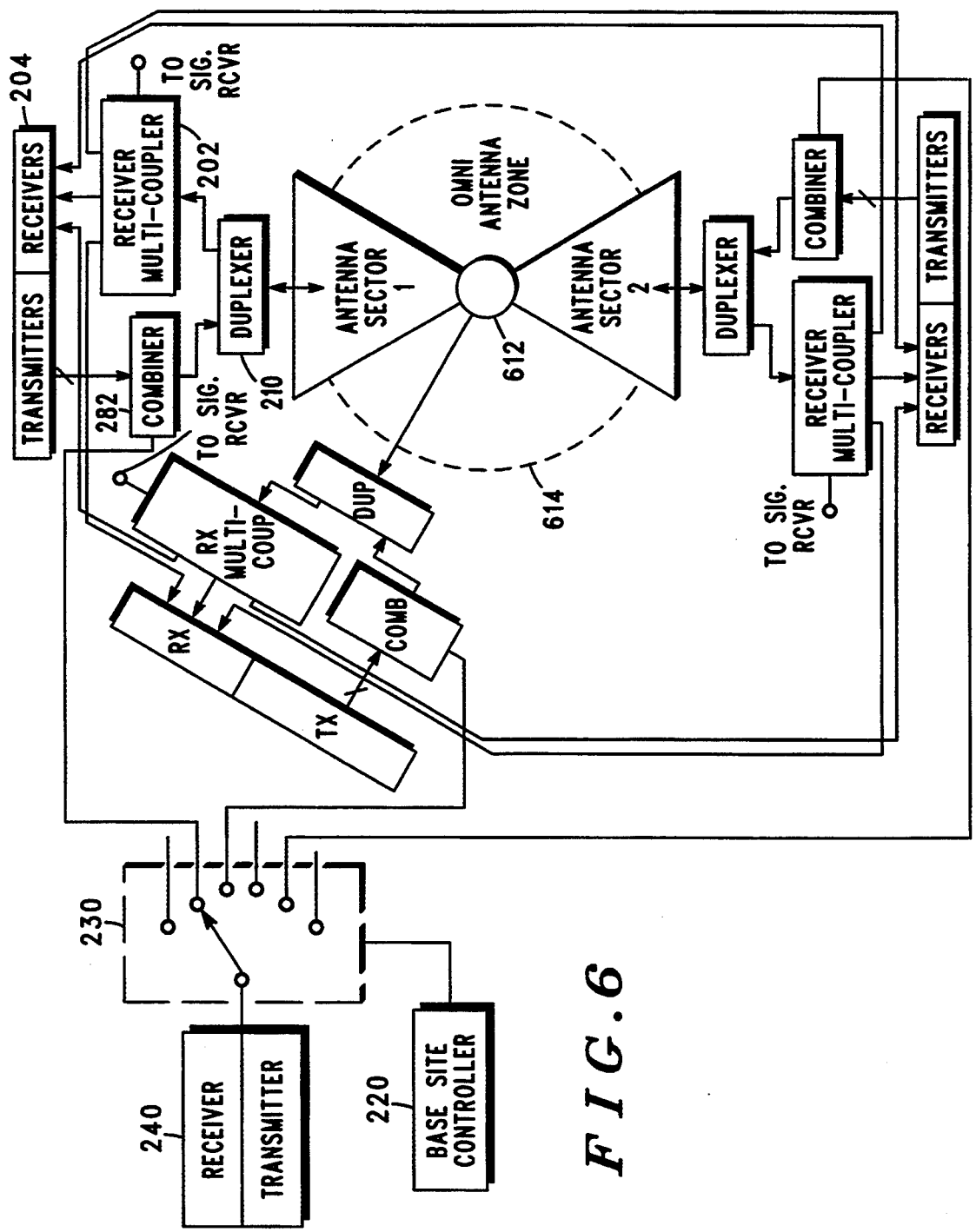
FIG. 6 is a detailed block diagram of cell site equipment which is similar to the equipment shown in FIG. 2 but modified to accommodate narrow communication regions.

FIG. 6 illustrates cell site equipment substantially the same as in FIG. 2 but including modifications to accommodate narrow communication regions, for example, along highways. The equipment that is common to the equipment in both FIGS. 2 and 6 should be apparent from the common terminology used therein. Differences between the FIGS. 2 and 6 include the omission of cell site equipment associated with antenna sectors 2, 3, 5 and 6; the addition of a conventional omni-directional antenna 612; and the associated cell site equipment for the omni-antenna zone 614 (depicted in dotted lines about the omni-antenna 612).

This arrangement of FIG. 6 is preferably used in a manner substantially similar to the operation of the cell site equipment of FIG. 2. At least one floating voice channel is provided through the switch 230 for communication in one of the three regions, i.e., one of the two sectorized regions or the omni-antenna zone (region). Upon demand, the floating voice channel is switched to the region requesting service. This manner of operation is particularly useful in a rural highway or railway application whereat the sectorized regions are aligned to cover as long a portion of the traveled path as possible.

In either situation, the traveling subscriber enters the communication system coverage area at one of the two sectorized regions and is assigned either a fixed channel or a floating channel. If the floating channel is assigned, the floating channel is preferably used throughout the path of travel, e.g., from antenna sector region 1, to the omni zone and into the antenna sector region 4. If a fixed channel is originally assigned, the floating channel is preferably used once the subscriber enters the omni-zone and, thereafter, used throughout the path of travel.

This arrangement of FIG. 6 provides significant advantages. The omni-zone prevents calls from being dropped as a subscriber rapidly crosses the sectorized regions. The omni-zone allows communication to be maintained while the subscriber is physically beneath the communication path of the sector antennas. Additionally, this arrangement provides an extremely cost effective implementation for this type of application. The floating channel technique reduces the cost by eliminating the need for equipment to accommodate unused channels.

Figure 5:
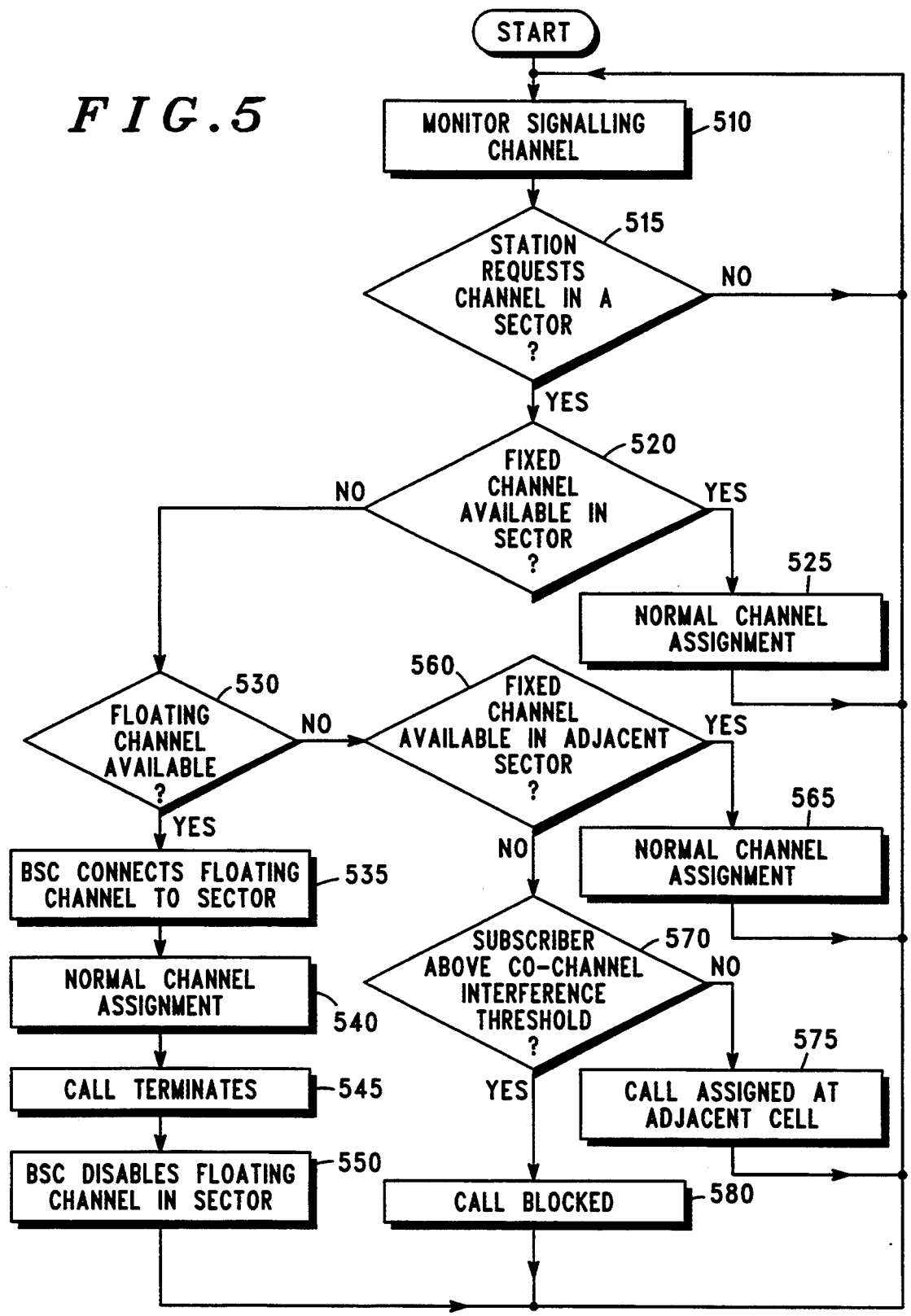
FIG. 5 is flow chart useful for operating the system illustrated in FIG. 2, according to the present invention.

FIG. 5 illustrates a flow chart useful for operating channel assignments in a particular cell for the system illustrated in FIG. 2, according to the present invention. This flow chart accommodates assignment operation for both floating voice channels as well as fixed (dedicated) voice channels for a cell. Modification of this flow chart for the operation of the equipment arranged in FIG. 6 should be readily apparent. The flow chart begins at block 510 where the base site controller is depicted monitoring the signalling channel for a subscriber radiotelephone call request. From block 510, flow proceeds to block 515 where a test is performed by the base site controller to determine if a subscriber station has requested the use of the voice channel in a sector. If not, flow proceeds to block 510.

If a subscriber station has requested a voice channel in a particular sector, flow proceeds from block 515 to block 520 where another test is performed to determine if a fixed channel is available in the particular sector. If a fixed channel is available, flow proceeds to block 525 where a channel assignment is made to the available voice channel. From block 525, flow returns to block 510.

If a fixed channel is not available in a particular sector, flow proceeds from block 520 to block 530 where a test is performed to determine if a floating channel is available in a particular sector. If a floating channel is available, flow proceeds to block 535 where the base site controller (BSC) controls the sector's RF coaxial switch to connect the available floating channel to the requesting subscriber station. From block 535, flow proceeds to block 540 where the actual channel assignment is made. Once the radiotelephone call terminates on the floating channel, depicted by block 540, the base site controller disconnects the connection of the floating channel to the particular sector, depicted at block 550. From block 550, flow returns to block 510.

From block 530, if a floating channel is not available in the particular sector, flow proceeds to block 560 where a test is performed to determine if a fixed channel is available in a sector which is adjacent to the particular sector in which a subscriber station requests a channel. This test illustrated in block 560 is typical (often referred to as sector sharing) in conventional sectorized telephone communication systems when there are no voice channels available at the sector from which a channel is requested. Thus, if a fixed channel is available in an adjacent sector, flow proceeds to block 565 where the requesting subscriber station is assigned a channel from the adjacent sector. From block 565, flow returns to block 510.

If a fixed channel is not available in an adjacent sector, flow proceeds from block 560 to block 570 where the base site controller determines if the requesting subscriber can be assigned to a channel in an adjacent cell, preferably to the nearest sector in the nearest cell, with respect to the subscriber unit. This is conventionally accomplished by determining if the assignment of a channel from an adjacent cell would cause undue co-channel interference in another cell. More specifically, if the subscriber signal strength in the target cell exceeds the system's cochannel interference threshold, flow proceeds to block 580 where the call request is denied (blocked). If the subscriber signal strength is not above the threshold, flow proceeds from block 570 to block 575 where the call is assigned to the adjacent cell. From block 575, flow returns to block 510.

If the signal strength of the requesting subscriber station is above the cochannel interference threshold, flow proceeds from block 570 to block 580 where the base site controller informs the subscriber station that the call request cannot be served. From block 580, flow returns to block 510.

The foregoing sequence illustrated in the flow chart of FIG. 5 incorporates a preferred sequence of channel availability checking. The base site controller first checks if the fixed channel is available in the particular sector, and if not, proceeds to check if a floating channel is available. After the base site controller has determined that neither a fixed nor a floating channel is available in a particular sector, only then does the base site controller check for channel availability in adjacent sectors. This sequence is important for channel usage efficiency. Optimally, the fixed channel(s) in each sector is (are) utilized before any floating channel is utilized.

One skilled in the art will recognized that various modifications may be made to the above described system without departing from the spirit or scope of the present invention.

We claim:

1. A cellular radiotelephone communication system, including:
   base site equipment for communicating with subscriber units in a plurality of regions including at least two sectorized regions, said sectorized regions being at least part of a geographic communication area served by said base site equipment; and
   means for assigning at least one floating communication channel for communication between the base site equipment and a subscriber unit at at least two of said plurality of regions.

2. A cellular radiotelephone communication system cell site equipment, comprising:
   (a) a radio frequency transmitter operating as one signal frequency source;
   (b) a first and a second signal combiner device coupled to a first and a second signal frequency source, respectively, each signal combiner device comprising coupling means for coupling the first and second signal frequency sources, respectively, to a first and second common transmitter output devices, respectively; and
   (c) a radio frequency switching means, operatively coupled between the radio frequency transmitter and the first and second signal combiner devices for coupling the radio frequency transmitter to either of the first and the second signal combiner devices.

3. The cellular radiotelephone communication system cell site equipment of claim 2 further comprising controlling means, operatively coupled to the radio frequency transmitter and the radio frequency switching means, for assigning the radio frequency transmitter to one of the first and the second common transmitter output device and dynamically switching the radio frequency transmitter to the first signal combiner device when the first common transmitter output device is assigned and to the second signal combiner device when the second common transmitter output device is assigned by the controlling means.

4. The cellular radiotelephone communication system cell site equipment of claim 2 wherein the one of the first and second common transmitter output devices coupled to the radio frequency transmitter is selected from the group consisting of a sectorized antenna and an omni-antenna.

5. The cellular radiotelephone communication system cell site equipment of claim 2 wherein the one of the first and second common transmitter output devices coupled to the radio frequency transmitter serves a geographic region selected from the group consisting of a sectorized antenna region and an omni-antenna zone.

6. A cellular radiotelephone communication system cell site equipment comprising:
   (a) a first and a second signal combiner coupling first and second signal transmitters, respectively, with first and second output devices, respectively; and
   (b) a switch, operatively coupled between a floating channel transmitter and the first and second signal combiners for coupling the floating channel transmitter to either of the first and the second signal combiners.

7. The cellular radiotelephone communication system cell site equipment of claim 6 further comprising a signal processor, operatively coupled to the floating channel transmitter and the switch for dynamically switching the floating channel transmitter to one of either the first and the second signal combiners while maintaining the floating channel transmitter at a same signal frequency.

8. The cellular radiotelephone communication system cell site equipment of claim 6 wherein each of the first and second transmitter output devices is selected from the group consisting of a sectorized antenna and an omni-antenna.

9. The cellular radiotelephone communication system cell site equipment of claim 6 wherein the first transmitter output device serves a geographic region different from a geographic region served by the second transmitter output device.

10. The cellular radiotelephone communication system cell site equipment of claim 9 wherein the first and the second transmitter output devices serve geographic regions selected from the group consisting of:
  (i) the first transmitter output device serving one sectorized antenna region within a first cell and the second transmitter output device serving another sectorized antenna region of the first cell;
  (ii) the first transmitter output device serving one sectorized antenna region within the first cell and the second transmitter output device serving omni-antenna zone of the first cell;
  (iii) the first transmitter output device serving one sectorized antenna region within the first cell and the second transmitter output device serving a sectorized antenna region of another cell; and
  (iv) the first transmitter output serving one sectorized antenna region within the first cell and the second transmitter output device serving a omni-antenna zone of another cell.

11. A method of transmitting floating and dedicated channels in a cellular radiotelephone system comprising the steps of:
  (a) coupling a first dedicated signal transmitter with a first output device via a first signal combiner;
  (b) coupling a second dedicated signal transmitter with a second output device via a second signal combiner;
  (c) coupling a floating channel switch between a floating channel signal transmitter and each of the first and second combiners; and
  (d) switching the floating channel switch to operatively couple the floating channel transmitter to one of the first and second signal combiners.

* * * * *